C. L. HOBBS.
HEAT RETAINING AUTOMOBILE HOOD.
APPLICATION FILED SEPT. 20, 1910.
1,162,777.
Patented Dec. 7, 1915.
2 SHEETS—SHEET 1.
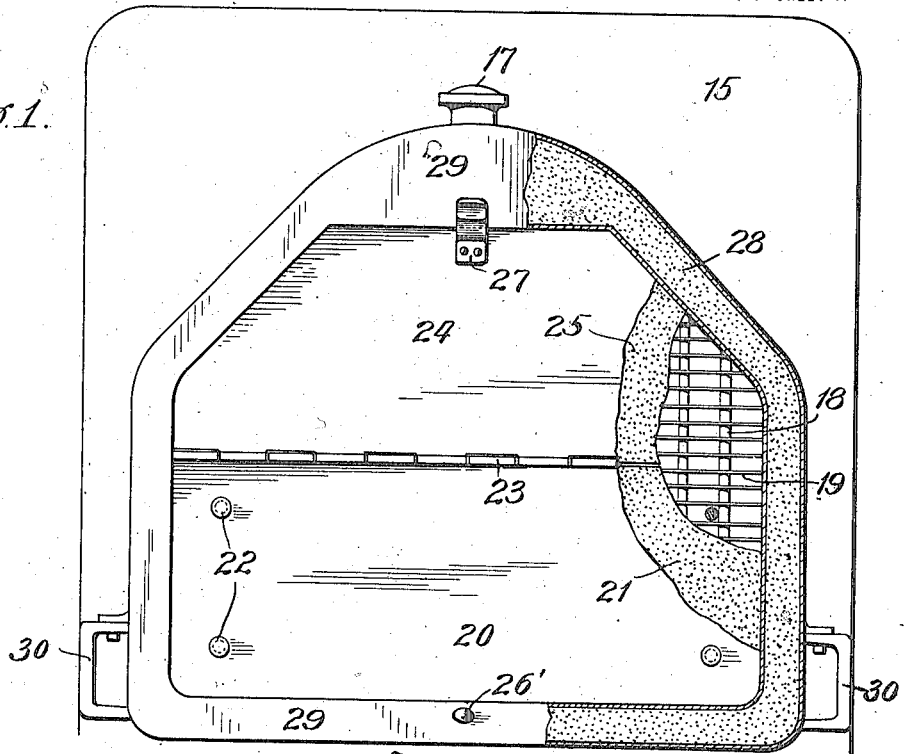
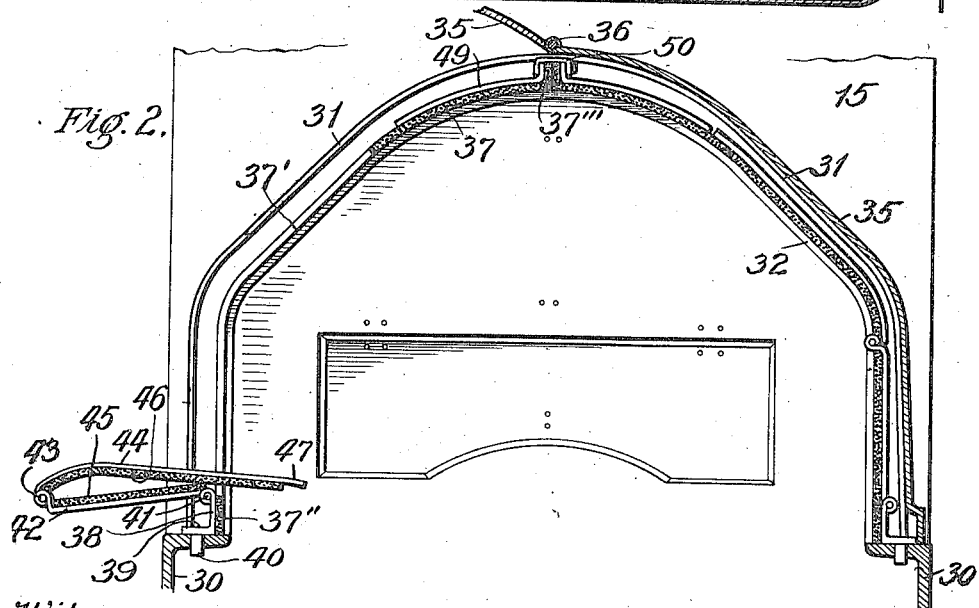
Witnesses
Inventor
Charles L. Hobbs,

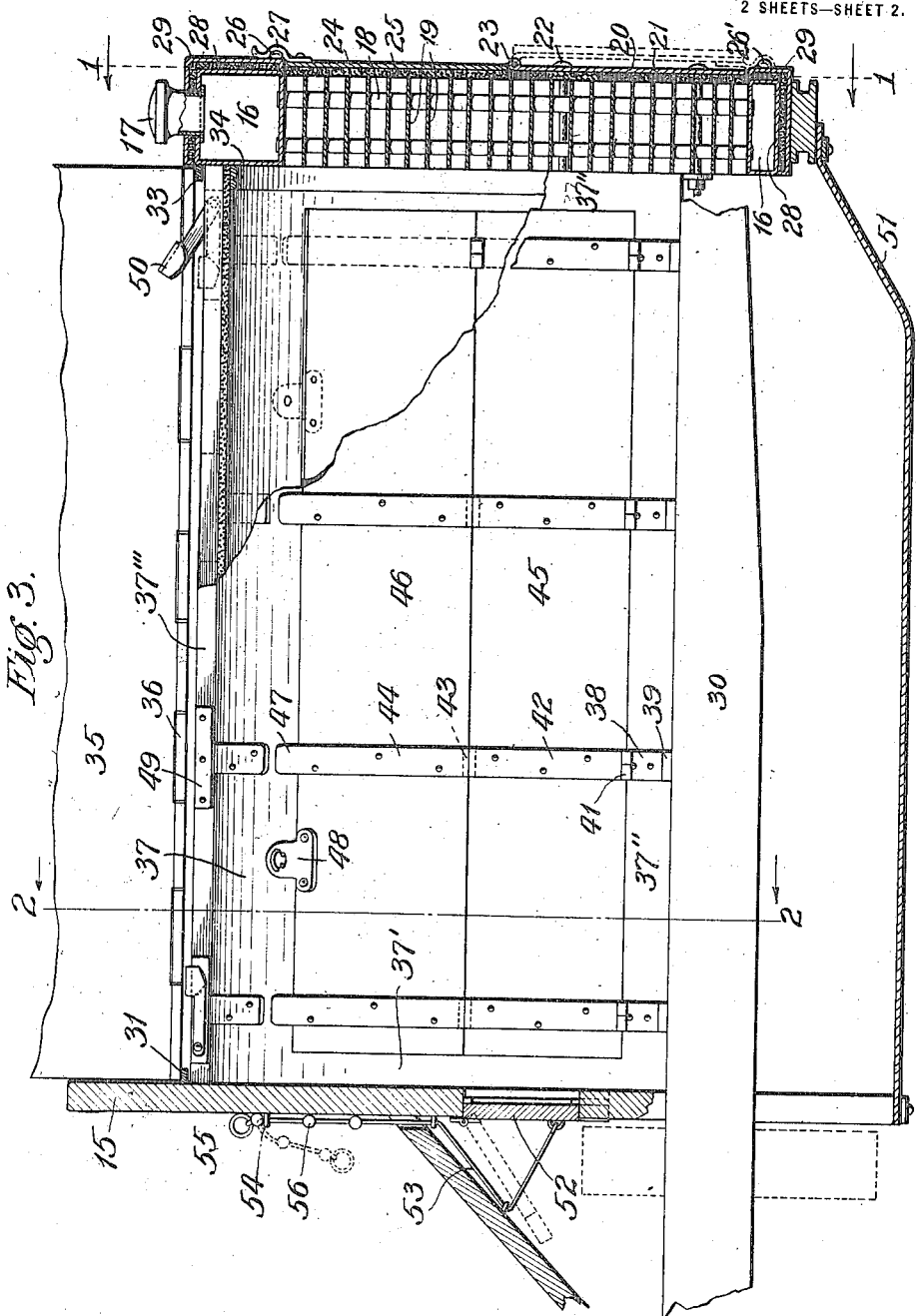

UNITED STATES PATENT OFFICE.

CHARLES L. HOBBS, OF CHICAGO, ILLINOIS.

HEAT-RETAINING AUTOMOBILE-HOOD.

1,162,777.   Specification of Letters Patent.   Patented Dec. 7, 1915.

Application filed September 20, 1910. Serial No. 582,897.

*To all whom it may concern:*

Be it known that I, CHARLES L. HOBBS, a citizen of the United States, residing at Chicago, in the county of Cook and State of Illinois, have invented certain new and useful Improvements in Heat - Retaining Automobile-Hoods, of which the following is a specification.

The principal object of my invention is to provide new and improved apparatus for retaining the heat of an automobile engine and associated parts.

Another object of my invention is to provide devices to prevent the radiation and loss of heat from an automobile engine and the parts associated therewith.

A further object of my invention is to provide a heat insulating inclosure for an automobile engine that can readily be displaced in whole or in part when desired both for the purpose of admitting air and for obtaining ready access to the parts within.

All these objects and various others will be made apparent in the following specification and claims, taken in connection with the accompanying drawings.

I have defined my invention in the appended claims, but for the purpose of explaining the prin ple thereof I have illustrated one specific embodiment in the accompanying drawings, in which—

Figure 1 is a front elevation partly broken away along the line 1—1 of Fig. 3. Fig. 2 is a transverse section on the line 2—2 of Fig. 3, and Fig. 3 is a longitudinal central vertical section with certain parts shown in elevation and broken away in places to show parts in the back ground.

The usual automobile dash-board is indicated by the reference numeral 15. At some distance in front of this is the radiator with the water or steam chamber 16. This is provided at the top with the usual removable cap 17, so that access may be had for filling the radiator with water. As shown in the drawings the top and bottom portions of the chamber 16 are connected by the vertical tubes 18 which carry the radiating fins 19.

Across the front of the radiator is the wall of heat insulating material 21, which may, for example, be composed of asbestos in sheets. Outside of this is the sheet metal plate 20, and the double wall 20—21 is secured in place to the lower part of the radiator front by the bolts 22. Hinged along the top edge of the plate 20, by the hinge joint 23, is another sheet metal plate 24, within which is a heat insulating layer 25 adapted to cover the upper portion of the radiator front. The free edge of the hinged wall 24—25 carries a double or S-hook 27, which is adapted to pinch tightly upon the stud 26 above or the stud 26' below.

The radiator front closure, just described, may be applied or removed as a whole by means of the bolts 22. It will ordinarily be used in this way in cold weather, but will be entirely removed in summer weather. In cold weather when the automobile is running, the upper hinged part 24—25 will be turned down, as shown in dotted lines in Fig. 3, admitting air to cool the radiator 16—18. But when the automobile is standing idle, the hinged part 24—25 of this closure will be turned up so as to entirely close the radiator front. This will prevent too great a cooling of the water in the radiator and in the engine behind the radiator. When the front is closed, the flap 24—25 will be held in place by the S-hook 27 engaging the stud 26 and when it is opened it will be held so by the same hook engaging the lower stud 26'. The layer of heat insulating material, such as sheet asbestos 28, is placed over the outside surfaces of the radiator chamber 16, and outside of this is a sheet metal shell 29. These parts are placed permanently and prevent radiation of heat from the chamber 16.

The side members 30 of the automobile frame support the lower edges of the ordinary sheet metal hood, which comprises the two sections 35 hinged along the top at 36. The two ledges 31 and 32 are attached to the front of the dashboard 16 and the two similar ledges 33 and 34 are attached to the rear face of the radiator 16. The hood 35, just described, has its ends resting upon the upper or outer ledges 31 and 33.

An inner heat insulating hood is provided, which is formed in two sections with their bottom edges resting on the bars 30 and their ends resting on the ledges 32 and 34. Each section of this lower heat insulating hood comprises the sheet of asbestos paper or asbestos fiber, or other heat insulating material 37. Portions 37' extend down the sides of the front and rear and another portion 37″ extends from front to rear along the bottom edge. The upper meeting edges of the two sections 37 are bent upwardly side by side as indicated by 37‴.

The lower edge portion 37″ has riveted thereto brackets 38 with toe parts 39 that rest upon the frame members 30. Studs 40 project down from these members 38—39 and engage holes in the frame members 30, so as to keep the parts in place. Each member 38—39 has hinged at 41 a strap 42, and beyond this, hinged at 43, is an extension strap of metal 44. The metal bands 42 have riveted thereto a sheet of asbestos paper, or other suitable heat insulating material 45, and similarly the straps 44 carry the sheet 46. The ends 47 of the straps 44 project beyond the edge of the sheet 46 and rest upon the main wall 37. Fastening tabs 48 are provided on the free edge of the sheet 46 to engage studs on the meeting edge of the sheet 37. The wall 37 is reinforced and held in shape by T-shaped members 49. Certain of these T-shaped stiffening members 49 have pivoted thereto clasps 50 which hold the upper edges of the sections 37 together.

When it is desired to obtain access to the parts within the automobile hood one outer sheet metal hood section 35 may be swung upwardly about the hinge 36. Then the fasteners 48 may be detached and the sheets 45 and 46 turned down to the position shown in Fig. 2, thus giving access to the engine and other apparatus under the hood. If more room is desired for working, the outer sheet metal hood sections 35 can be lifted up bodily, the clasps 50 released, and the two inner heat insulating sections 37 can then be readily lifted aside.

At the rear of the automobile hood, under the dashboard 15 and the adjacent foot board, is a hinged door 52 that controls an opening into the space under the hood. This space just referred to is closed underneath by the wall 51, so that the only openings thereto are through the radiator at the front and past the door 52 (when opened) at the rear. This door 52 is controlled by a pull-cord 53 passing through an eye 54 and carrying a ring 55 at its end. The knots or knobs 56 may be made to engage the ring 54 and thus hold the door 52 at various widths of opening.

The device which I have disclosed in this specification is efficient to prevent undue radiation of heat from the automobile engine or associated parts, when the automobile is standing still. At such time the hinged members 24—25 and 52 should be closed. But when operating the automobile these members may be easily opened so as to give access of air. By adjusting the door 52 the amount of air drawn through the radiator and past the engine can easily be regulated. The inner supplemental hood can easily be opened to give access to the parts within, and when greater freedom is desired it can be instantly removed and set aside. The front closure, comprising the members 21—20 and 24—25, can be readily removed and set aside when not needed by taking out the bolts 22. Similarly the supplemental hood 37 can be easily set aside by unfastening the clasps 50. The heat insulating sheath 28 remains permanently in place, but obviously it would not be objectionable under any circumstances, and it acts efficiently in combination with the other parts to retain the heat of the radiator when that is desired.

Both the covering for the radiator front and the supplemental hood are simple and inexpensive to construct. The supplemental hood is concealed under the main hood 35 and may therefore be constructed of comparatively inexpensive material, because it is entirely concealed.

I claim:

1. In a device of the class described, an automobile hood, and a supplemental inner hood in combination therewith, said supplemental hood being made of heat insulating material, and each hood being independently removable from the automobile.

2. In a device of the class described, a double walled automobile hood, the outer wall consisting of sheet metal and the inner wall consisting of heat insulating material, the two walls being independenlty removable.

3. In a device of the class described, an outer sheet metal automobile hood, and a supplemental inner heat insulating hood in combination therewith, said inner hood being made in two sections detachably united along a middle longitudinal line at the top.

4. In a device of the class described, an automobile having side frame members, an outer sheet metal hood with its lower side edges resting thereon, an inner heat insulating hood with its side edges also resting on said frame members, and supporting ledges at the front and rear.

5. In a device of the class described, an automobile having side frame members, a dash-board, a radiator, ledges on the front of said dash-board and rear of said radiator, and a heat insulating hood supported by said ledges and by said side members.

6. In a device of the class described, an automobile hood, and a supplemental inner hood in combination therewith, said supplemental hood being made in two sections of heat insulating material with a door in each section.

7. In a device of the class described, an automobile hood, and a supplemental inner heat insulating hood in combination therewith, said supplemental hood having an opening in its side with a hinged closure therefor.

8. In a device of the class described, an automobile hood, and a supplemental inner heat insulating hood in combination therewith, said supplemental hood having an opening in its side with a double fold closure therefore hinged along the lower edge.

9. In a device of the class described, an automobile hood, and a supplemental inner heat insulating hood in combination therewith, said inner hood being made in two sections with the meeting edges turned up so as to lie side by side, and pivoted clasps to detachably unite said meeting edges.

10. In a device of the class described, an automobile hood, and a separate insulating hood located within and spaced inwardly from said first named hood.

11. In a device of the class described, an automobile hood, and a separate supplementary hood located within and spaced inwardly from said first named hood whereby an air space is formed between said hoods.

In testimony whereof, I have subscribed my name.

CHARLES L. HOBBS.

Witnesses:
ALICE M. VANDERKLOOT,
FANNIE G. BENDING.